United States Patent Office 3,238,138
Patented Mar. 1, 1966

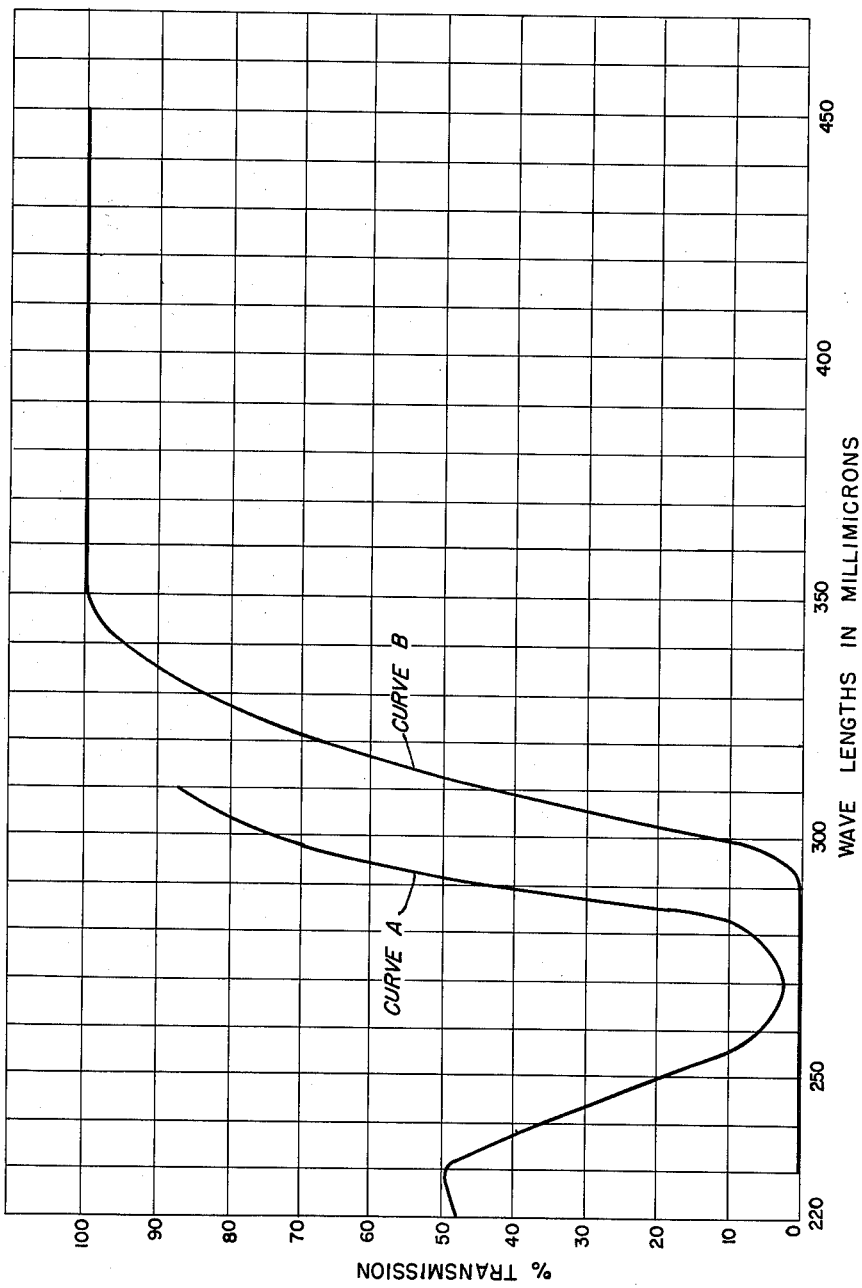

3,238,138
2,4,6-TRIARYL-1,3,5-TRIAZINES IN ULTRAVIOLET LIGHT ABSORPTION METHOD AND COATING COMPOSITION
John B. Braunwarth and William L. Fierce, Crystal Lake, Ill., assignors, by mesne assignments, to Union Oil Company of California, Los Angeles, Calif., a corporation of California
Filed Dec. 28, 1961, Ser. No. 162,729
4 Claims. (Cl. 252—300)

This invention relates to the use of triaryltriazines as the operative agent in ultraviolet light absorbing compositions.

Ultraviolet light absorbers have many applications. For example, they are used in plastics principally for stabilization of polymers or secondary ingredients against photocatalyzed deterioration, and in glazing, coating, and packaging materials for the purpose of protecting them from ultraviolet radiation. Ultraviolet absorbers are used in conjunction with waxes and other protective finishes for protecting surfaces which are subject to ultraviolet light induced deterioration. Ultraviolet absorbers, when used in conjunction with translucent aggregates, such as glass, are useful in the manufacture of filters adapted to screen ultraviolet light. Ultraviolet absorbers, which must have a high ultraviolet absorptivity and be stable to ultraviolet radiation, must also be substantially free of color (initially and after aging); be compatible with the materials with which they are used; and be inert with respect to weathering, the binding material employed, and other additives of the compositions with which they are used.

It is a primary object of this invention to provide ultraviolet light absorbing compositions containing as an operative ingredient a triaryltriazine. Another object of this invention is to provide a method for increasing the ultraviolet light absorption characteristic of relatively translucent materials. Another object of this invention is to provide a method for blocking the passage of ultraviolet light. Still another object of this invention is to provide a protective coating composition which provides an effective barrier against ultraviolet light. Yet another object of this invention is to provide a dermotherapeutic ointment for use in the prevention of erythema. A specific object of this invention is to provide a laundry detergent which includes an ultraviolet-responsive whitening agent. Other object of the invention will become apparent from the following description.

In accordance with this invention, triaryltriazine compounds are employed in amounts in the range of about 0.001 to 10% by weight in conjunction with binders or vehicles suitable for the specific purpose for which the ultraviolet absorbing properties of the triaryltriazines are to be used. Since the amount of ultraviolet light absorbed by an absorbing material is proportional to the thickness or layer of material through which the rays must pass, it is evident that the concentration of the triaryltriazine should vary within the above-prescribed limits in accordance with the thickness of the absorbing layer or object, the intensity of the ultraviolet source from which the rays emanate, and the degree of absorption desired. The term "aryl" as used in this specification and the appended claims, is in accordance with the definition given in Hackh's Chemical Dictionary and denotes any organic radical derived from an aromatic hydrocarbon by the removal of one hydrogen atom, the aromatic hydrocarbon being any compound of carbon and hydrogen that contains in its molecular structure a closed ring of carbon atoms having conjugated double bonds, such as phenyl, naphthyl, and anthryl.

Triaryltriazine compounds suitable for use in the method and manufactures of this invention include 2,4,6-triaryl-1,3,5-triazines of the formula:

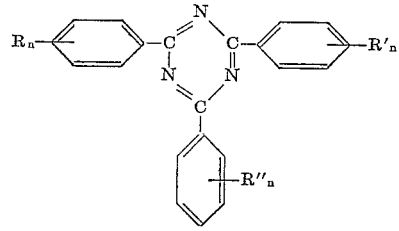

wherein R, R', and R" are hydrogen, phenyl, alkyl substituted phenyl, or low molecular weight alkyl radicals, and $n$ is an integer in the range of 0 to 5. Examples of such compounds are triphenyltriazine, diphenyl (p-phenyl phenyl) triazine, diphenyl (p-toluyl phenyl) triazine, phenyl (p-toluyl phenyl) (p-toluyl) triazine, tri-diphenyl triazine, tri (p-toluyl phenyl) triazine, tri (p-ethylbenzyl) triazine, tri (m-ethyl phenyl) triazine, tri (m,p-xylyl) triazine, tri (m-methyl p-ethyl phenyl) triazine, tri (pentamethyl phenyl) triazine, and tri (p-amyl phenyl) triazine. The alkyl radicals or alkyl portions of substituted phenyl radicals preferably will be lower alkyl groups, i.e., $C_1$ to $C_5$ radicals of straight, branched, or olefinic configuration.

Also useful are 2,4,6-triaryl-1,3,5-triazines wherein one or more of the aryl groups are polynuclear aromatic, or aryl or alkyl substituted polynuclear aromatic, groups. Examples of such compounds are tri (β-naphthalyl) triazine; tri (β-phenanthryl) triazine; tri (β-chrysyl) triazine; tri (β-3 retyl) triazine; dephenyl, β-naphthalyl triazine, ditoluyl, β-anthracyl triazine; and phenyl (β-phenyl phenyl), β-naphthalyl triazine.

The materials useful in this invention can be made by processes known to the prior art, such as those of U.S. Patent 1,989,042; or disclosed by Smolin et al., Interscience Publishers, Inc., February 1959; and Bengelsdorf, "The Triamerization of Aromatic Nitriles," Journal of the American Chemical Society, volume 80, page 1442.

The ultraviolet light absorbing properties of the compounds employed in accordance with this invention were demonstrated by determining the ultraviolet absorptivity of a 0.013% by weight and a 0.0013% by weight solution of triphenyltriazine in iso-octane. Iso-octane was employed as a vehicle because of its uniformly high transmittancy for ultraviolet light of varying wave lengths. The experiments were performed using a Beckman Spectrophotometer equipped with a blue phototube. The tests were carried out using a hydrogen lamp as an ultraviolet source for wavelengths between 220 and 320 millimicrons, and a tungsten lamp for wavelengths between 320 and 400 millimicrons. The spectrophotometer is a combination of a spectroscope and a photometer in a single instrument which enables the operator to measure the wavelength at which absorption takes place and the intensity of such absorption. Referring to the drawing, the graph shows a plot of ultraviolet light transmission as a function of light wavelength, expressed in millimicrons. Curve A is for a 0.0013% solution, and Curve B is for the 0.013% solution. In each case, the cell had an effective thickness of 1 centimeter measured in the direction of travel of the ultraviolet beam. The test results show the compound to be ideally suited for the absorption of ultraviolet light having a wavelength of less than about 310 millimicrons.

The ultraviolet absorbing compounds of this invention have many applications. For example, there are many instances in which it is desirable to block ultraviolet light to protect a material from the deleterious effect of ultraviolet light. This may be accomplished by interposing a film, screen, or barrier of a composition containing the ultraviolet absorbing agent between the source of ultraviolet light and the material to be protected therefrom. The vehicle for the ultraviolet absorbers may be transparent or translucent to visible light in instances where it is also desirable that the visible light pass through the material being protected, or where it is desired that the protective layer or film not obscure an attractive surface finish which is subject to ultraviolet light induced deterioration. Examples of vehicles which may be used include the various plastic materials such as cellulose esters, including cellulose nitrate, cellulose acetate and the like; cellulose ethers and methyl cellulose; the polystyrene plastics, such as polystyrene itself; polymers of ring-substituted styrenes, such as p-methyl styrene; vinyl polymers, such as polyvinylbutyral, polyvinyl chloride, and the like; the acrylic resins, such as polymers and copolymers of methylacrylate, acrylamide, acrylonitrile, and the like; and the polyolefins such as polyethylene, polypropylene, and the like; and polyesters including unsaturated-modified polyesters. In addition to various plastics, the vehicle may be any of a number of waxes, both natural and synthetic, or coating materials such as varnishes, gums, shellacs, and the like.

A highly useful coating composition can be made by incorporating 0.1 to 10% by weight of a triaryltriazine in a natural or synthetic wax, or a varnish or shellac. The vehicle may be any of the aforenamed materials providing only that the composition is sufficiently fluid to be applied as a relatively thin film and is capable of forming an adhering film or layer upon the surface to which it is applied. Waxes and varnishes are eminently suited to this purpose. Thus, a coating composition which upon application will form an excellent protective overcoating for ultraviolet light sensitive finishes, such as lacquer finishes, can be made by incorporating about 1% by weight of a triaryltriazine, such as triphenyltriazine, or mixtures of triaryltriazines, in a varnish.

The ultraviolet absorbing agents of this invention can also be utilized in conjunction with plastics which are subject to photocatalyzed deterioration, as well as to serve as an ultraviolet barrier. The photo-degradation of plastics by ultraviolet is a two-fold problem, since loss of desirable physical properties, and discoloration frequently result. The addition of the ultraviolet absorbing agents of this invention provides an excellent solution to both these problems. Examples of plastic in which it is desirable to incorporate an ultraviolet absorber are polyolefins, such as polyethylene, to prevent an ultraviolet catalyzed oxidation reaction, polyester resins to prevent discoloration, polystyrenes to prevent discoloration, celluloses, such as cellulose nitrate, to prevent discoloration, and deterioration, and vinyls to prevent discoloration. Where the ultraviolet absorbing agent is incorporated in the plastic to be protected, it will ordinarily be dispersed throughout the plastic while the plastic is in a fluid state, the amount of ultraviolet absorbing agent being in the range of about 0.01 to 1% by weight. For example, polyethylene may be stabilized by incorporating therein about 0.1% by weight of triphenyltriazine.

Alternatively, and sometimes preferably, plastic objects which are susceptible to ultraviolet light induced deterioration can be protected by placing thereon a thin film or overcoating of a vehicle throughout which is dispersed the ultraviolet absorbing agent. Especially suitable for such uses are waxes, varnishes and the like, which are relatively resistant themselves to the deteriorating effects of ultraviolet light. However, the vehicle employed in the overcoating composition may be the same as the plastic material from which the object itself is fabricated. Thus, for example, a polyester resin object may be protected by applying a thin film of a paraffin wax in which is incorporated about 0.1 to about 10% by weight of a triaryltriazine. Specifically, about 1% by weight of triphenyltriazine in a hard paraffin wax is suitable.

A filter capable of passing visible light but which will not pass ultraviolet light may be made by incorporating 0.1 to 10% by weight of a triaryltriazine in a translucent plastic, such as celluloid. The translucent plastic is then fabricated as a thin, and preferably optically flat, sheet.

The ultraviolet absorbing agents of this invention are also useful where it is desirable to increase the ultraviolet absorptivity of a material. For example, they can be used as optical bleaches to whiten or brighten textile fiber and paper. The addition of about 0.001 to 0.1% by weight of a triaryltriazine to laundry detergents results in the washed textiles absorbing ultraviolet light, and thereby becoming whiter and brighter in appearance. A suitable detergent may be prepared by incorporating in a standard laundry detergent, such as those consisting principally of sodium petroleum sulfonates, 0.001 to 0.1% by weight of a triaryltriazine.

A dermo-therapeutic composition useful for preventing erythema may be compounded by incorporating about 0.1 to 10% by weight of a compound of the formula:

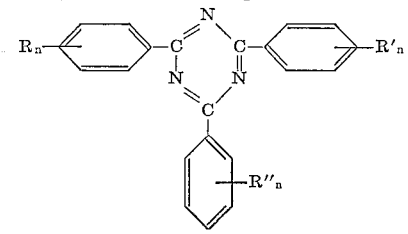

wherein R, R', and R" are low molecular weight alkyl radicals, and $n$ is an integer in the range of 0 to 5; in a nontoxic ointment which has a suitable consistency for convenient application to exposed skin areas. An especially prefered ointment base is petrolatum, in which may be incorporated 1% by weight of triphenyltriazine.

The embodiments of the invention in which an exclusive property or privilege is claimed are defined as follows:

1. The method of shielding materials from ultraviolet light which consists in disposing between said materials and a source of said light an ultraviolet light translucent barrier containing as the sole ultraviolet light absorber about 0.01 to 10% by weight of a 2,4,6-triaryl-1,3,5-triazine compound of the formula:

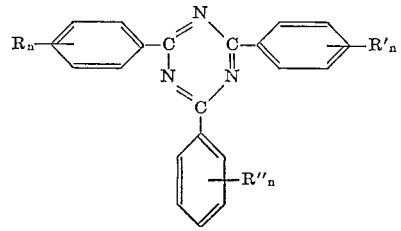

wherein R, R' and R" are of the group consisting of hydrogen, phenyl, lower alkyl-substituted phenyl and lower alkyl and $n$ is an integer in the range of 0 to 5.

2. The method in accordance with claim 1 in which said triaryltriazine compound is 2,4,6-triphenyl-1,3,5-triazine.

3. A coating composition consisting essentially of an ultraviolet light translucent film-forming material containing as the sole ultraviolet light absorber about 0.1 to 10% by weight of a 2,4,6-triaryl-1,3,5-triazine compound of the formula:

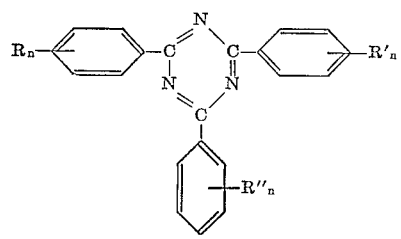

wherein R, R' and R" are of the group consisting of hydrogen, phenyl, lower alkyl-substituted phenyl and lower alkyl and $n$ is an integer in the range of 0 to 5.

4. A coating composition in accordance with claim 3 in which said triaryltriazine compound is 2,4,6-triphenyl-1,3,5-triazine.

References Cited by the Examiner

UNITED STATES PATENTS

| | | | |
|---|---|---|---|
| 1,989,042 | 1/1935 | Kunz | 260—248 |
| 2,693,492 | 11/1954 | Hoch | 252—300 |
| 2,723,288 | 11/1955 | Roberts | 252—300 |
| 2,874,090 | 2/1959 | Klein | 167—90 |
| 3,014,957 | 12/1961 | Hoehn | 252—300 |
| 3,118,887 | 1/1964 | Hardy | 252—300 |
| 3,119,823 | 1/1964 | Shapiro | 252—300 |

OTHER REFERENCES

Metze: "A New Synthesis of the Fluorescent 1,2,4 Triazines," Chemical Abstracts, vol. 53, 1959, p. 3237(b–e).

JULIAN S. LEVITT, Primary Examiner.

JOSEPH R. LIBERMAN, Examiner.